(12) United States Patent
Chen et al.

(10) Patent No.: US 7,969,724 B2
(45) Date of Patent: Jun. 28, 2011

(54) DATA STORAGE ASSEMBLY

(75) Inventors: Yun-Lung Chen, Taipei Hsien (TW); Rui-Peng Shen, Shenzhen (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 64 days.

(21) Appl. No.: 12/485,348

(22) Filed: Jun. 16, 2009

(65) Prior Publication Data
US 2010/0165563 A1   Jul. 1, 2010

(30) Foreign Application Priority Data

Dec. 31, 2008   (CN) .................. 2008 2 0303940 U

(51) Int. Cl.
H05K 5/00   (2006.01)
H05K 7/00   (2006.01)
(52) U.S. Cl. ......... 361/679.33; 361/679.37; 361/679.38; 361/679.39

(58) Field of Classification Search ............. 361/679.33, 361/679.37, 679.38, 679.39
See application file for complete search history.

(56) References Cited

U.S. PATENT DOCUMENTS

| | | | | |
|---|---|---|---|---|
| 6,580,607 | B1 * | 6/2003 | Feldmeyer | 361/679.36 |
| 7,102,885 | B2 * | 9/2006 | Chen et al. | 361/679.31 |
| 7,471,510 | B2 * | 12/2008 | He | 361/679.33 |

* cited by examiner

*Primary Examiner* — Jayprakash N Gandhi
*Assistant Examiner* — Anthony M Haughton
(74) *Attorney, Agent, or Firm* — D. Austin Bonderer

(57) ABSTRACT

A data storage assembly includes a bracket, a data storage device, a driving member and a locking member. The bracket includes a sidewall. The data storage device is moveably received in the bracket along a first direction parallel to the sidewall. The driving member is moveable along the first direction and includes a driving portion. The locking member includes a resisting portion corresponding to the driving portion of the driving member. The driving portion is capable of urging the resisting portion to move the locking member along a second direction perpendicular to the first direction. The storage device is secured in the bracket in a locking position along a first direction by the locking member.

20 Claims, 4 Drawing Sheets

DATA STORAGE ASSEMBLY

BACKGROUND

1. Technical Field

The disclosure generally relates to data storage assemblies, especially to a data storage assembly with at least one data storage device retained in a bracket.

2. Description of Related Art

A typical data storage device uses a bracket, a pair of slide members attached to the data storage device, and a pair of levers pivotably secured to the bracket. The bracket defines a pair of through openings therein. The slide members are disposed on the data storage device. Each slide member has a resilient engagement portion for engaging in the through openings of the bracket respectively. Each of the levers has a projecting portion for urging the corresponding engagement portion of the slide member to resiliently deform. However, due to the number of elements needed and the complexity of the structure, the mounting apparatus described above is expensive to manufacture.

DETAILED DESCRIPTION

Figure 1:
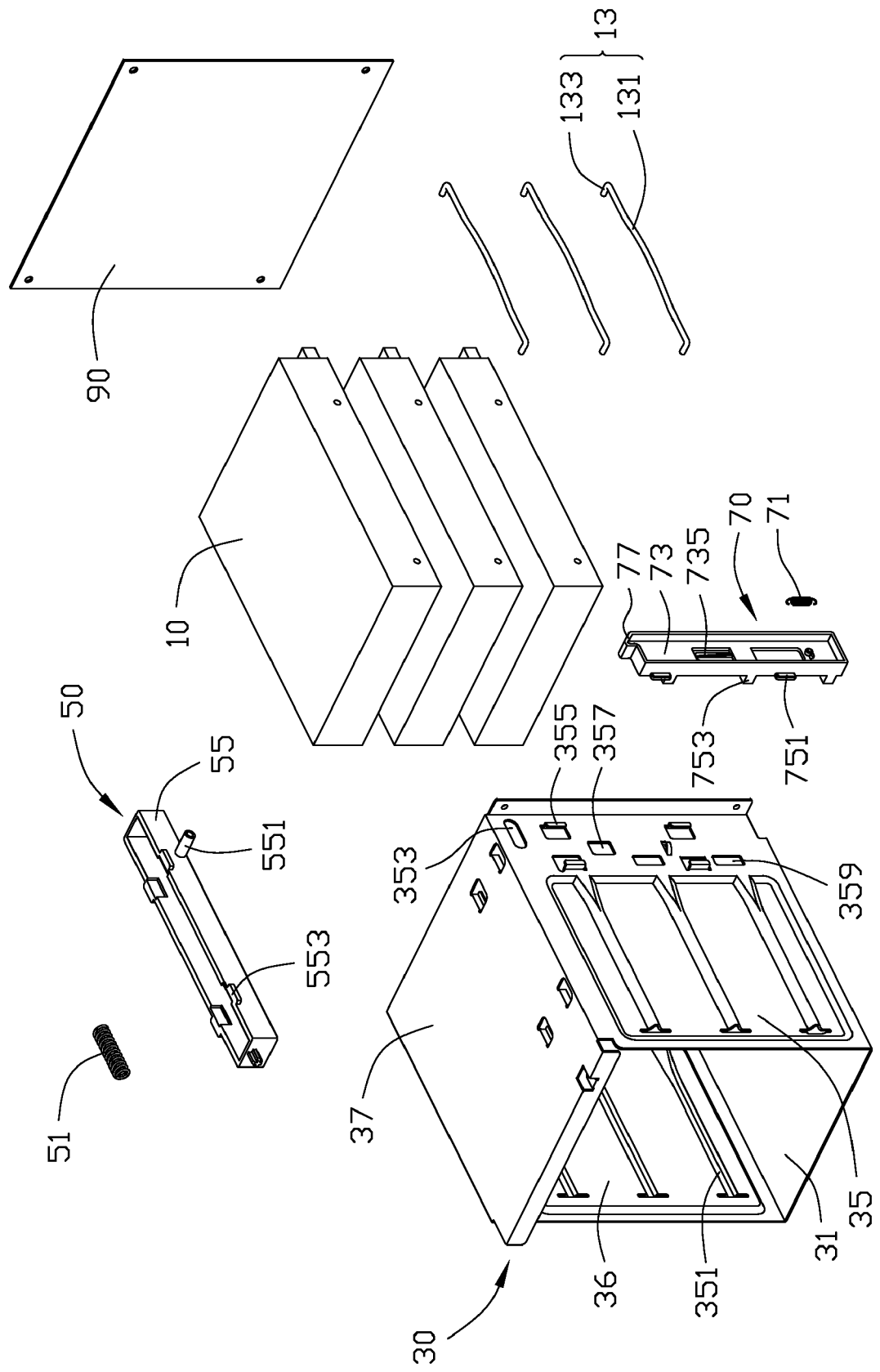
FIG. 1 is an exploded, isometric view of an embodiment of the data storage assembly.

Referring to FIG. 1, a data storage assembly of one embodiment includes a bracket 30, a plurality of data storage devices 10 moveably received in the bracket 30, a driving member 50, a locking member 70, and a front panel 90.

A rail member 13 is attached to each side of each data storage device 10. In one embodiment, the rail member 13 is an elastic wire. The rail member 13 includes two latch portions 133 and a slender body 131.

A bottom wall 31, a first sidewall 35, a second sidewall 36 and a top wall 37 of the bracket 30 cooperatively define a passageway for the data storage devices 10. The front panel 90 is capable of covering the sliding passageway on one side of the bracket 30. Each of the first sidewall 35 and the second sidewall 36 has a plurality of recessed straight slide ways 351 for guiding the rail members 13. A through opening 359 is defined in the first sidewall 35 on an extending pathway of each slide way 351. A slot 353 and a stopper hole 357 are respectively defined in the first sidewall 35. A plurality of hooks 355 is formed on the first sidewall 35 to holding the locking member 70.

The driving member 50 is slidably attached to an inner surface of the top wall 37. The driving member 50 includes a body 55 and a driving portion 551 protruding from the body 55. The body 55 has a U-shaped configuration in cross-section. In one embodiment, the driving portion 551 is post.

Figure 2:
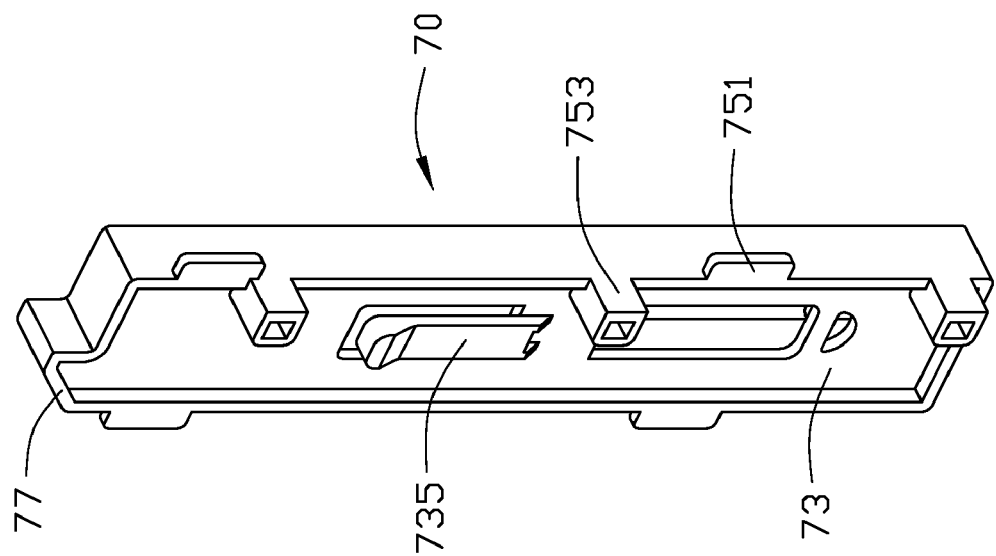
FIG. 2 is an enlarged view of a locking member of the data storage assembly in FIG. 1.

Referring to FIG. 2, the locking member 70 is slidably attached to an outer surface of the first sidewall 37. The locking member 70 includes a body 73 and a resisting portion 77 corresponding to the driving portion 551 of the driving member 55. The resisting portion 77 includes a slope. A block portion 753 protrudes from the body 73 corresponding to each through opening 359 of the first sidewall 35. A plurality of guiding rims 751 protrudes from the body 73 corresponding to the hooks 355 of the first sidewall 35. A resilient stopper member 735 extends from the body 73 corresponding to the stopper hole 357.

Figure 3:
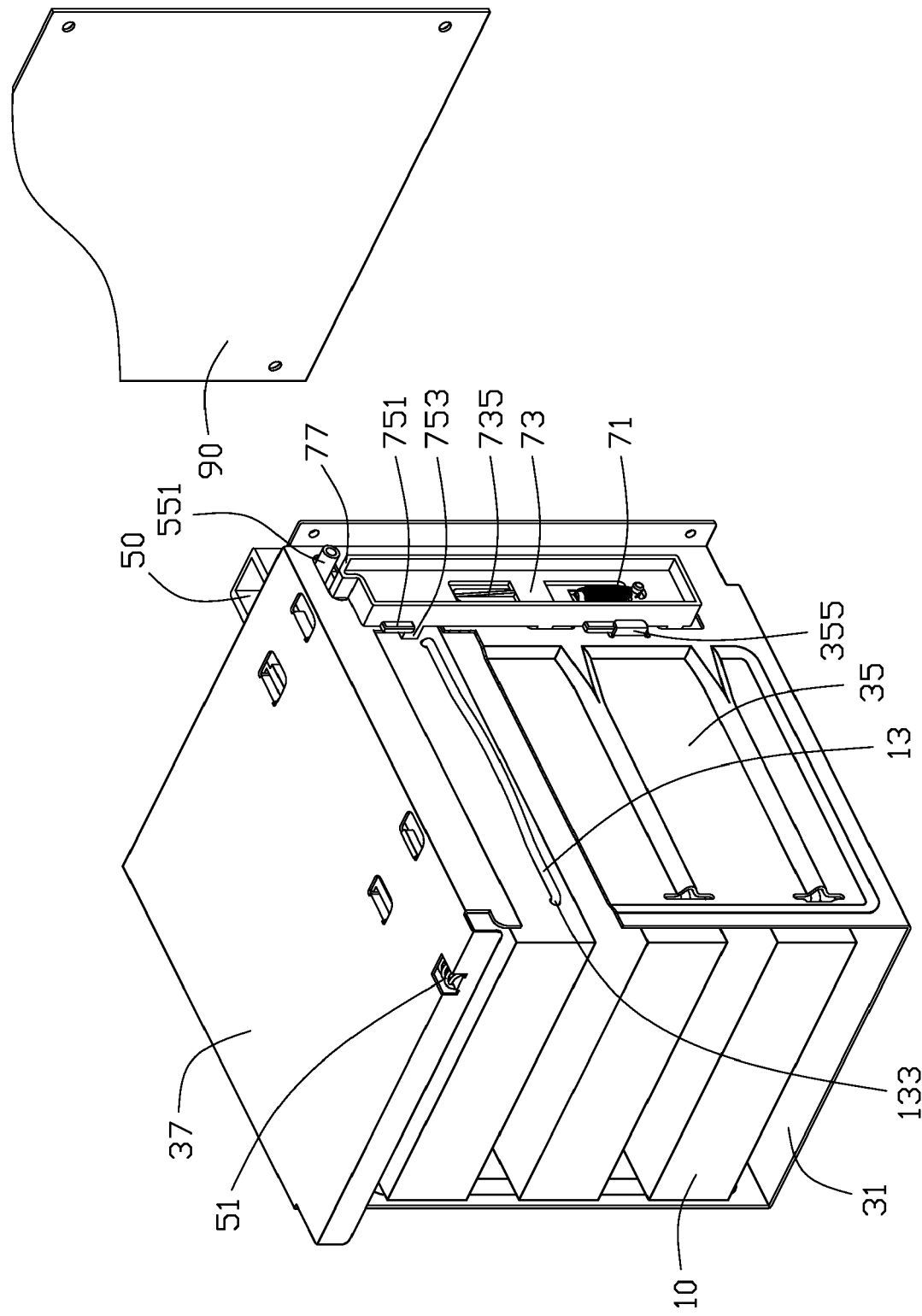
FIG. 3 is an assembly view with partial section of a bracket of FIG. 1 before a front panel is assembled.

Referring to FIG. 3, in assembling the driving member 50, the driving member 50 is slidably attached to the inner surface of the top wall 37. The driving portion 551 extends through the slot 353. A compression spring 51 is sandwiched between the top wall 37 and the driving member 50. When the compression spring 51 is at a released state, one section of the body 55 protrudes out of the bracket 30.

In assembling the locking member 70, the guiding rims 751 are held by the hooks 355, such that the locking member 70 is slidably attached to the outer surface of the first sidewall 35. The block portions 753 extend through the corresponding through openings 359. An extension spring 71 is assembled between the locking member 77 and the first sidewall 35 to pull the locking member 77 upward. The resilient stopper member 735 deforms into the stopper hole 357 and a distal end of the stopper member 735 contacts against the first sidewall 35 adjacent to the stopper hole 357 to restrict the locking member 70 from undue upward movement. The resisting portion 77 abuts on the driving portion 551 of the driving member 50.

In assembling one of the data storage devices 10 into the bracket 30, two opposite rail members 13 are slid into the corresponding slide ways 351 of the first sidewall 35 and the second sidewall 36. The data storage device 10 is removable from the passageway of the bracket 30 towards the front panel 90.

Figure 4:
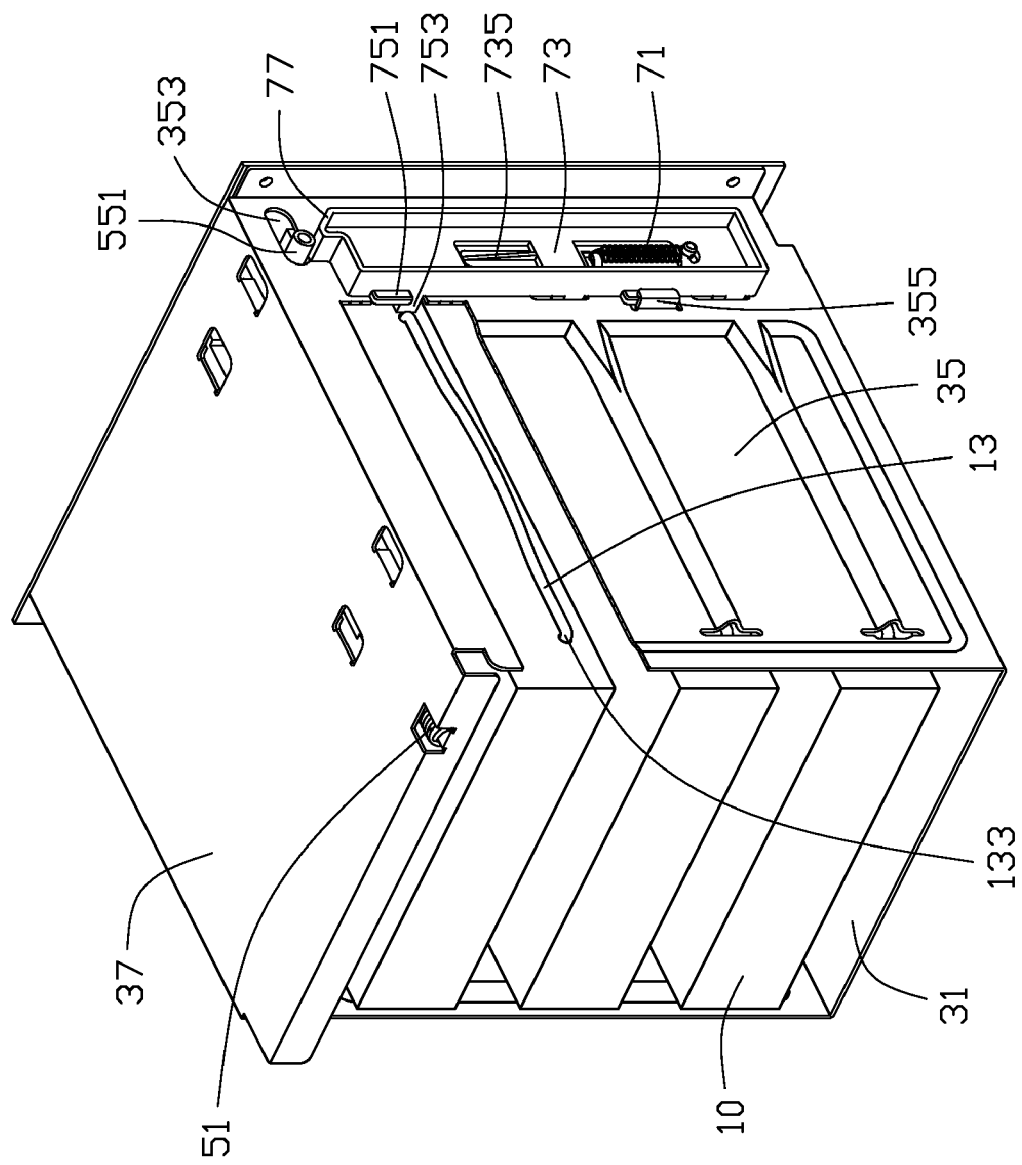
FIG. 4 is similar to FIG. 3, but the front panel is assembled.

Referring to the FIG. 4, when the front panel 90 is assembled to the bracket 30, the front panel 90 pushes the driving member 50 to urge the driving member 50 to move further into the bracket 30. The driving portion 551 moves along a first direction parallel to the top wall 37. The resisting portion 77 is actuated by the driving portion 551 to move downwardly along a second direction. The block portions 753 move downward to block on a movement pathway of the rail member 13 to block the data storage device 10 from moving out of the bracket 30. The data storage device 10 is in a locking position.

When the front panel 90 is detached from the bracket 30. The driving member 50 moves outward from the top wall 30 by release of the compression spring 51. The driving portion 551 moves out to release the locking member 70. The locking member 70 moves upward and the block portions 753 move away from the rail member 13 along the second direction. The data storage device 10 is then removable from the bracket 30.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A data storage assembly comprising:
 a bracket comprising a sidewall, a bottom wall perpendicular to the sidewall, and a top wall parallel to the bottom wall;
 a data storage device moveably received in the bracket along a first direction parallel to the sidewall;
 a driving member slidably attached to an inner surface of the top wall, the driving member comprising a driving portion, wherein the driving member is moveable relative to the top wall and the data storage device along the first direction; and a locking member, the locking member comprising a resisting portion, wherein the driving portion is capable of urging the resisting portion to move the locking member along a second direction perpendicular to the first direction, and when the locking member is in a locking position, the data storage device is secured in the bracket by the locking member.

2. The data storage assembly of the claim 1, wherein the resisting portion comprises a slope, and the driving member is a post for actuating the locking member on the slope.

3. The data storage assembly of the claim 1, wherein the bracket further comprises a top wall, the top wall is perpendicular to the sidewall, and the driving member is slidably attached to the top wall.

4. The data storage assembly of the claim 1 further comprising a front panel, wherein when the front panel is attached to the bracket, the driving member is actuated by the front panel to move into the bracket, such that the locking member is in the locking position.

5. The data storage assembly of the claim 1, wherein a rail member is attached to a side of the data storage device, and the sidewall of the bracket has a recessed slide way for guiding the rail member.

6. The data storage assembly of the claim 5, wherein the rail member is an elastic slender wire.

7. The data storage assembly of the claim 6, wherein the locking member further comprises a block portion, and the block portion blocks the slide way in the locking position.

8. The data storage assembly of the claim 1, wherein the locking member and the driving member are respectively positioned on opposite sides of the sidewall.

9. A data storage assembly comprising:

a bracket comprising a first sidewall, a second sidewall parallel to the first sidewall and a top wall connected to the first sidewall and the second sidewall, the first sidewall having a recessed slide way;

a driving member slidably attached to an inner surface of the top wall, the driving member comprising a driving portion; and a locking member slidably attached to the first sidewall, the locking member comprising a block portion, wherein the driving portion extends through the first sidewall to actuate the locking member to slide on the first sidewall, such that the block portion blocks the recessed slide way in a locking position.

10. The data storage assembly of the claim 9 further comprising at least one data storage device slidably received in the bracket.

11. The data storage assembly of the claim 10, wherein a rail member is attached to a side of the data storage device corresponding to the rail member.

12. The data storage assembly of the claim 11, wherein the rail member is an elastic slender wire.

13. The data storage assembly of the claim 12, wherein the block portion blocks the rail member from moving in the slide way in the locking position.

14. The data storage assembly of the claim 9 further comprising a front panel, wherein when the front panel is attached to the bracket, the driving member is actuated by the front panel to move into the bracket, and the block portion is in the locking position.

15. The data storage assembly of the claim 9, wherein the locking member comprises a resisting portion corresponding to the driving portion, the resisting portion comprises a slope, and the driving member is a post for actuating the locking member on the slope.

16. A data storage assembly comprising:

a bracket comprising a first sidewall, a second sidewall parallel to the first sidewall and a top wall connected to the first sidewall and the second sidewall, the first sidewall having a recessed slide way;

a driving member slidably attached to an inner surface of the top wall, a spring located between the driving member and the top wall, the driving member comprising a driving portion that extends through the first sidewall; and a locking member slidably attached to the first sidewall, the locking member comprising a block portion;

wherein the driving portion is configured to actuate the locking member between a locked position, where the driving member is received in the bracket to deform the spring, and the block portion blocks the slide way; and an unlocked position, where the driving member extends out of the bracket to release the spring, and the block portion is moved away from the slide way.

17. The data storage assembly of the claim 16, further comprising at least one data storage device slidably received in the bracket.

18. The data storage assembly of the claim 17, wherein a rail member is attached to a side of the data storage device corresponding to the rail member.

19. The data storage assembly of the claim 18, wherein the rail member is an elastic wire.

20. The data storage assembly of the claim 18, wherein the block portion blocks the rail member from moving in the slide way in the locked position.

* * * * *